United States Patent
Sunagawa

(10) Patent No.: US 9,442,547 B2
(45) Date of Patent: Sep. 13, 2016

(54) METHOD AND SYSTEM FOR AUTOMATICALLY RETURNING AN INFORMATION PROCESSING APPARATUS TO A STATE BEFORE POWER OUTAGE

(71) Applicant: Yuuki Sunagawa, Chiba (JP)

(72) Inventor: Yuuki Sunagawa, Chiba (JP)

(73) Assignee: RICOH COMPANY, LTD., Tokyo (JP)

( * ) Notice: Subject to any disclaimer, the term of this patent is extended or adjusted under 35 U.S.C. 154(b) by 314 days.

(21) Appl. No.: 14/079,030

(22) Filed: Nov. 13, 2013

(65) Prior Publication Data
US 2014/0143562 A1    May 22, 2014

(30) Foreign Application Priority Data

Nov. 20, 2012  (JP) ................... 2012-254163
Oct. 21, 2013  (JP) ................... 2013-218708

(51) Int. Cl.
*G06F 1/00*  (2006.01)
*G06F 1/26*  (2006.01)
*G06F 11/14* (2006.01)
*G06F 1/30*  (2006.01)

(52) U.S. Cl.
CPC ................ *G06F 1/263* (2013.01); *G06F 1/30* (2013.01); *G06F 11/1402* (2013.01); *G06F 11/1441* (2013.01)

(58) Field of Classification Search
CPC ............... G06F 1/263; G06F 11/1402; G06F 11/1441; G06F 1/30
See application file for complete search history.

(56) References Cited

U.S. PATENT DOCUMENTS

2011/0187440 A1    8/2011  Yamaguchi

FOREIGN PATENT DOCUMENTS

| CN | 101339416 A | 1/2009 |
|----|-------------|--------|
| CN | 201523320 U | 7/2010 |
| CN | 102006385 A | 4/2011 |
| CN | 102377230 A | 3/2012 |
| JP | 06-327168   | 11/1994 |
| JP | 07-281797   | 10/1995 |
| JP | 10-333786   | 12/1998 |
| JP | 11-038841   | 2/1999 |

(Continued)

OTHER PUBLICATIONS

Combined Chinese Office Action and Search Report issued Nov. 26, 2015 in Patent Application No. 201310744041.7 (with English language translation).

*Primary Examiner* — Xuxing Chen
(74) *Attorney, Agent, or Firm* — Oblon, McClelland, Maier & Neustadt, L.L.P.

(57) ABSTRACT

An information processing apparatus includes a first control unit configured to control a processing unit; a first power supply that supplies power to the first control unit; a switching unit configured to switch on or off the first power supply; a second control unit configured to operate according to a setting and control the switching unit; a second power supply that supplies power to the second control unit; and a setting change unit configured to perform the setting of the second control unit so that the switching unit switches off the first power supply when a voltage of the second power supply is lower than a preset voltage, and perform the setting of the second control unit so that the switching unit switches on the first power supply when the voltage of the second power supply is equal to or higher than the preset voltage.

20 Claims, 11 Drawing Sheets

(56) References Cited

FOREIGN PATENT DOCUMENTS

| | | |
|---|---|---|
| JP | 2002-78196 A | 3/2002 |
| JP | 2008-176288 | 7/2008 |
| JP | 2009-223384 A | 10/2009 |
| JP | 2011-160526 | 8/2011 |
| JP | 2011-205869 A | 10/2011 |
| JP | 2012-93978 A | 5/2012 |
| JP | 2012-175496 A | 9/2012 |

METHOD AND SYSTEM FOR AUTOMATICALLY RETURNING AN INFORMATION PROCESSING APPARATUS TO A STATE BEFORE POWER OUTAGE

CROSS-REFERENCE TO RELATED APPLICATIONS

The present application claims priority to and incorporates by reference the entire contents of Japanese Patent Application No. 2012-254163 filed in Japan on Nov. 20, 2012 and Japanese Patent Application No. 2013-218708 filed in Japan on Oct. 21, 2013.

BACKGROUND OF THE INVENTION

1. Field of the Invention

The present invention relates to an information processing apparatus.

2. Description of the Related Art

An information processing apparatus that can shift to a standby state where only a main power supply is turned off needs to control the main power supply to be turned on or off using an electrical signal. In a case of using a rocker switch for the main power supply, a user needs to operate the rocker switch so as to switch on or off the main power supply. Furthermore, in order to turn on or off the rocker switch using an electrical signal, it is necessary to use an expensive, large-sized, and electrical-control dedicated rocker switch.

Furthermore, use of a simple configuration push switch as a switch that switches on or off a main power supply has a problem such that, when power outage occurs while an information processing apparatus is operating, it is difficult to automatically return the information processing apparatus to a state before the power outage.

For example, Japanese Patent Application Laid-open No. 2011-160526 discloses an electronic device that is capable of returning to a state before power outage even if power outage occurs while the electronic device is operating by controlling a transistor to be turned on or off according to the state before power outage, that is, an operating state before the supply of power from a commercial power supply is shut off when the supply of power from a power supply unit is resumed.

However, the conventional technique has a problem that it is impossible to turn on a main power supply when the duration of the power outage is short.

Accordingly there is a need to provide an information processing apparatus that is capable of turning on a main power supply even if the duration of power outage is short.

SUMMARY OF THE INVENTION

According to an embodiment, an information processing apparatus includes a first control unit, a first power supply, a switching unit, a second control unit, a second power supply, and a setting change unit. The first control unit is connected to an external load. The first power supply is connected to an external power source and the first control unit and supplies power to the first control unit. The switching unit is connected between the first power supply and the external power source and is configured to switch on or off the first power supply. The second control unit is connected to the switching unit and is configured to control switching operation of the switching unit according to a setting. The second power supply is connected to the second control unit and the external power source and supplies power to the second control unit. The setting change unit is connected to the second power supply and the second control unit and is configured to perform the setting of the second control unit so that the switching unit switches off the first power supply when a voltage of the second power supply is lower than a preset voltage, and perform the setting of the second control unit so that the switching unit switches on the first power supply when the voltage of the second power supply is equal to or higher than the preset voltage.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
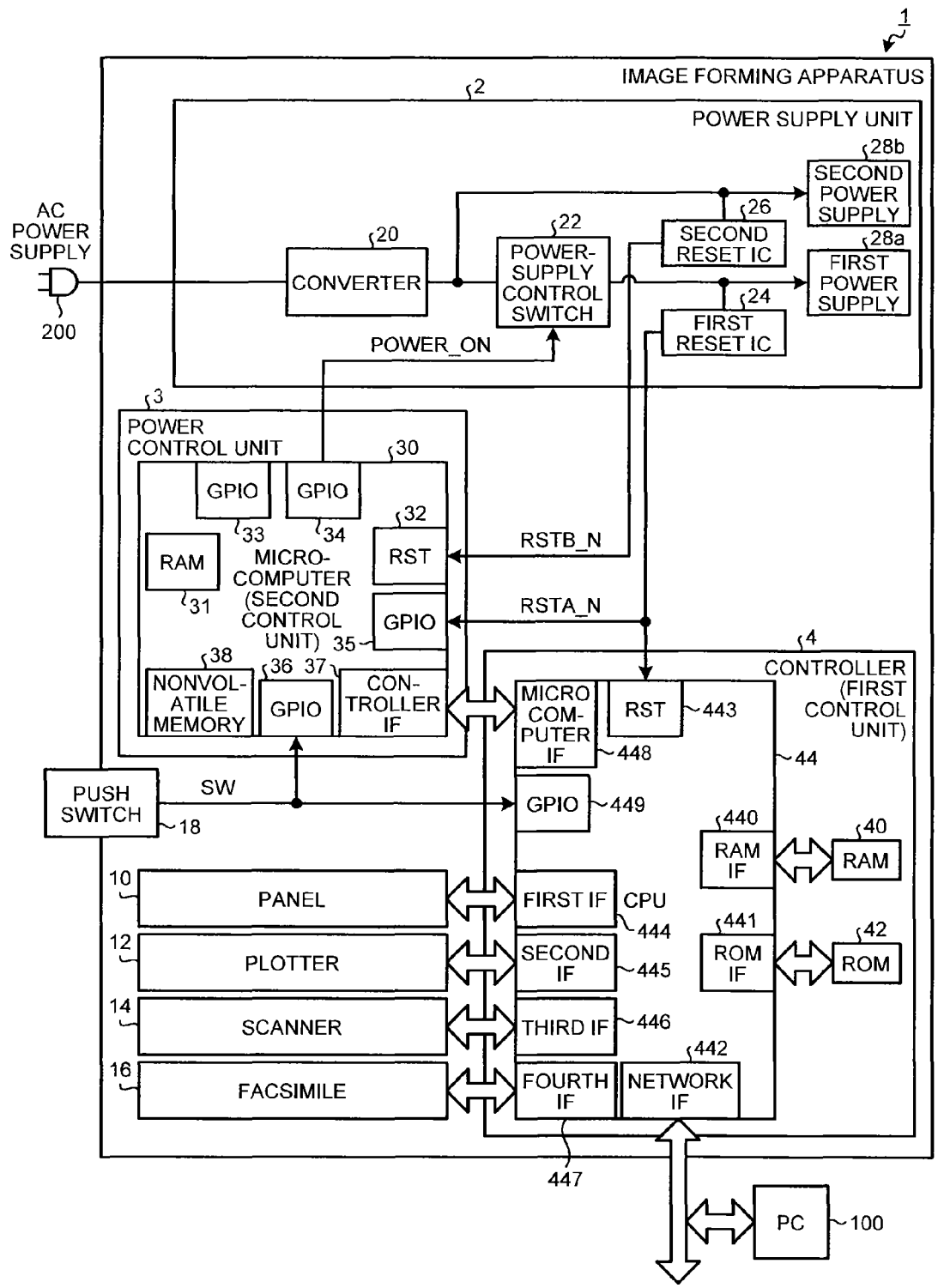
FIG. 1 is a configuration diagram of an example of an outline of an image forming apparatus that is an information processing apparatus according to an embodiment of the present invention.

Exemplary embodiments of an information processing apparatus will be explained below in detail with reference to the accompanying drawings. FIG. 1 is a configuration diagram of an example of an outline of an image forming apparatus 1 that is an information processing apparatus according to an embodiment of the present invention. The image forming apparatus 1 includes a power supply unit 2, a power control unit (second control unit) 3, a controller (first control unit) 4, a panel 10, a plotter 12, a scanner 14, a facsimile 16, and a push switch 18.

The panel 10 displays thereon information about the image forming apparatus 1. The plotter 12 outputs images formed by the image forming apparatus 1 on a sheet or the like. The scanner 14 reads images. The facsimile 16 communicates with an external device by facsimile communication. That is, the panel 10, the plotter 12, the scanner 14, and the facsimile 16 respectively serve as a processing unit that performs processes. The push switch 18 outputs a pulse indicating that the push switch 18 is pressed to a microcomputer 30 and a CPU 44 (described later), when, for example, being pressed by a user.

The power supply unit 2 includes a converter 20, a power-supply control switch 22, a first reset IC 24, a second reset IC 26, a first power supply 28a, and a second power supply 28b. The converter 20 converts an alternating-current (AC) voltage (AC power) supplied via a power plug 200 into a direct-current (DC) voltage, and applies the DC voltage to the first power supply 28a and the second power supply 28b. The power-supply control switch (switching unit) 22 switches on or off the first power supply 28a according to the control of the power control unit 3.

The first reset IC 24 starts the CPU 44 (described later) when a voltage of the first power supply 28a is equal to or higher than a preset voltage (RSTA detection level: threshold), and stops the CPU 44 when the voltage of the first power supply 28a is lower than the RSTA detection level. Specifically, the first reset IC 24 switches over between assertion and negation of a reset signal (RSTA_N).

The second reset IC 26 starts the microcomputer 30 (described later) when a voltage of the second power supply 28b is equal to or higher than a preset voltage (RSTB detection level: threshold), and stops the microcomputer 30 when the voltage of the second power supply 28b is lower than the RSTB detection level. Specifically, the second reset IC 26 switches over between assertion and negation of a reset signal (RSTB_N). The RSTA detection level and the RSTB detection level are both set to be equal to or higher than recommended operating voltages of all devices. Furthermore, the RSTB detection level is set higher than the RSTA detection level.

The first power supply 28a applies a DC voltage to the controller 4, the panel 10, the plotter 12, the scanner 14, and the facsimile 16. The second power supply 28b applies a DC voltage to the power control unit 3.

The power control unit 3 includes the microcomputer 30. The microcomputer 30 is an integrated circuit into which a processor such as a CPU (not shown), a RAM 31, an RST 32, GPIOs (General Purpose Input/Output) 33, 34, 35, and 36, a controller interface (IF) 37, and a nonvolatile memory 38 are integrated. The microcomputer 30 can be configured so that respective integrated units such as the nonvolatile memory (storage unit) 38 are provided outside of a chip. That is, either the microcomputer 30 or a CPU (not shown) of the microcomputer 30 can function as the second control unit.

The microcomputer 30 receives the reset signal (RSTB_N) output from the second reset IC 26 by the RST 32. The microcomputer 30 outputs a POWER_ON signal to the power-supply control switch 22 by the GPIO 34 and controls the power-supply control switch 22 to be turned on or off. The microcomputer 30 receives the reset signal (RSTA_N) output from the first reset IC 24 by the GPIO 35. The microcomputer 30 detects the pressing of the push switch 18 by the GPIO 36. The microcomputer 30 communicates with the CPU 44 (described later) by the controller IF 37.

The controller 4 includes a RAM 40, a ROM 42, and the CPU 44. The CPU 44 is an integrated circuit that includes a RAM interface (IF) 440, a ROM interface (IF) 441, a network IF 442, an RST 443, a first IF 444, a second IF 445, a third IF 446, a fourth IF 447, a microcomputer IF 448, and a GPIO 449. Therefore, either the controller 4 or the CPU 44 can serve as the first control unit. Furthermore, the microcomputer 30 and the CPU 44 can be included in one chip.

The network IF 442 is a communication unit that communicates with an external PC (Personal Computer) 100 or the like via a network. The first IF 444 is a panel interface that communicates with the panel 10. The second IF 445 is a plotter interface that communicates with the plotter 12. The third IF 446 is a scanner interface that communicates with the scanner 14. The fourth IF 447 is a facsimile interface that communicates with the facsimile 16.

The CPU 44 receives the reset signal (RSTA_N) output from the first reset IC 24 by the RST 443. The CPU 44 communicates with the microcomputer 30 by the microcomputer IF 448. The CPU 44 detects the pressing of the push switch 18 by the GPIO 449. The push switch 18 is pressed by a user so as to switch on or off the first power supply 28a, which is a main power supply of the image forming apparatus 1. In the following explanations, elements substantially identical to those constituting the image forming apparatus 1 shown in FIG. 1 are denoted by the same reference numerals.

An operation performed by the image forming apparatus 1 is explained next. When the power plug 200 is connected to an outlet, the converter 20 converts an AC voltage from the power plug 200 into a DC voltage and applies the DC voltage to the second power supply 28b. The second power supply 28b applies a DC voltage to the microcomputer 30.

When the push switch 18 is pressed in a state where the first power supply 28a, which is the main power supply, is turned off, the microcomputer 30 detects the pressing of the push switch 18. When the pressing of the push switch 18 is detected, the microcomputer 30 turns on the first power supply 28a by turning on the power-supply control switch 22. When the first power supply 28a is turned on, the first power supply 28a supplies the power to the controller 4, the panel 10, the plotter 12, the scanner 14, and the facsimile 16.

In this way, while the first power supply 28a is turned off, the microcomputer 30 detects the pressing of the push switch 18. When the first power supply 28a is turned on, the CPU 44 starts. The CPU 44 outputs a signal indicating the completion of startup to the microcomputer 30 after the startup and the completion of initialization or the like. Upon receiving the signal indicating the completion of the startup from the CPU 44, the microcomputer 30 stops detecting the pressing of the push switch 18. After the microcomputer 30 stops detecting the pressing of the push switch 18, the CPU 44 detects the pressing of the push switch 18.

When the push switch 18 is pressed after the first power supply 28a is turned on, the CPU 44 detects the pressing of the push switch 18, stops an operation of software, and stops access to a nonvolatile device such as an HDD (not shown) or the nonvolatile memory 38. Upon completion of a stopping process for stopping an operation of the software and stopping the access to the nonvolatile device, the CPU 44 outputs a signal indicating that a preparation to turn off the first power supply 28a is completed to the microcomputer 30.

Upon receiving the signal indicating that a preparation to turn off the first power supply 28a is completed, the microcomputer 30 turns off the first power supply 28a by turning off the power-supply control switch 22. The microcomputer 30 writes a flag indicating that the CPU 44 is stopped (normally turned off) according to a preset procedure to, for example, the nonvolatile memory 38.

The microcomputer 30 determines whether the CPU 44 is normally turned off (whether the image forming apparatus 1 is normally turned off, i.e., whether the image forming apparatus 1 is in standby state) at the time of the startup or the like by whether there is a flag written to the nonvolatile memory 38. For example, the microcomputer 30 determines that the image forming apparatus 1 is not normally turned off because of power outage or the like by determining that there is no flag written to the nonvolatile memory 38.

Figure 2:
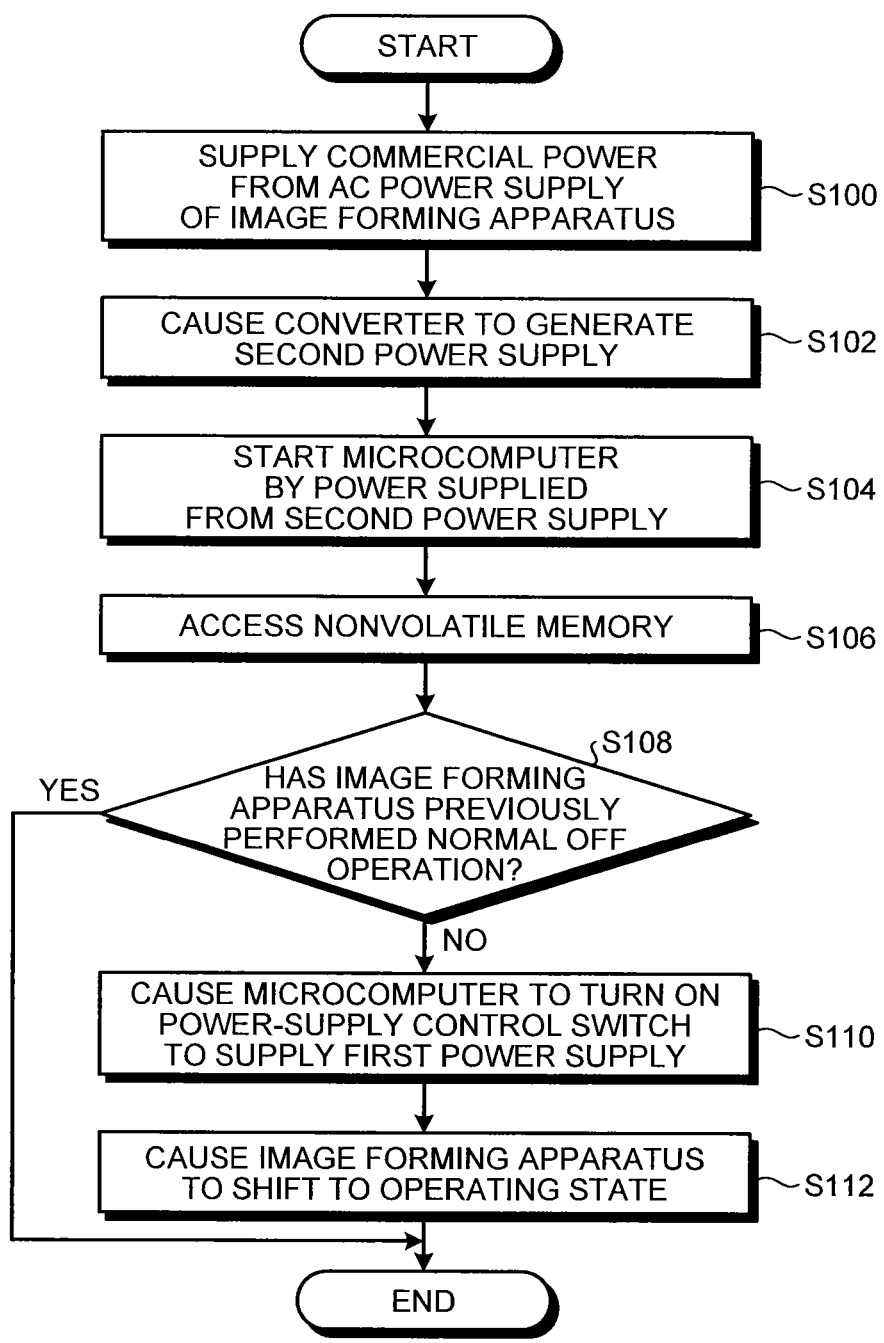
FIG. 2 is a flowchart of an operation performed by the image forming apparatus in a case of a recovery of commercial power from power outage.

A plurality of operations related to turning on or off of a power supply of the image forming apparatus 1 are explained below in detail with reference to flowcharts and the like. FIG. 2 is a flowchart of an operation performed by the image forming apparatus 1 in a case of a recovery of commercial power from power outage. As shown in FIG. 2, at step S100, upon a recovery of commercial power from power outage, commercial power (an AC voltage) is supplied to the converter 20 via the power plug 200 of the image forming apparatus 1.

At step S102, the converter 20 of the image forming apparatus 1 generates the second power supply 28b (applies a DC voltage to the second power supply 28b).

At step S104, the microcomputer 30 of the image forming apparatus 1 is started by the power supplied from the second power supply 28b.

At step S106, the microcomputer 30 accesses the nonvolatile memory 38.

At step S108, the microcomputer 30 determines whether the image forming apparatus 1 previously performs a normal OFF operation by determining whether there is the flag described above in the nonvolatile memory 38. When it is determined that the image forming apparatus 1 has not previously performed the normal OFF operation (NO at step S108), the microcomputer 30 proceeds to a process at step S110. Meanwhile, when it is determined that the image forming apparatus 1 has previously performed the normal OFF operation (YES at step S108), the microcomputer 30 ends processing. That is, the microcomputer 30 awaits the pressing of the push switch 18 when determining that the image forming apparatus 1 has previously performed the normal OFF operation.

At step S110, the microcomputer 30 of the image forming apparatus 1 turns on the power-supply control switch 22 to cause the first power supply 28a to apply a DC voltage (supply power from the first power supply 28a) to the controller 4, the panel 10, the plotter 12, the scanner 14, and the facsimile 16.

At step S112, the controller 4, the panel 10, the plotter 12, the scanner 14, and the facsimile 16 are started and the image forming apparatus 1 shifts from a standby state to an operating state.

Figure 3:
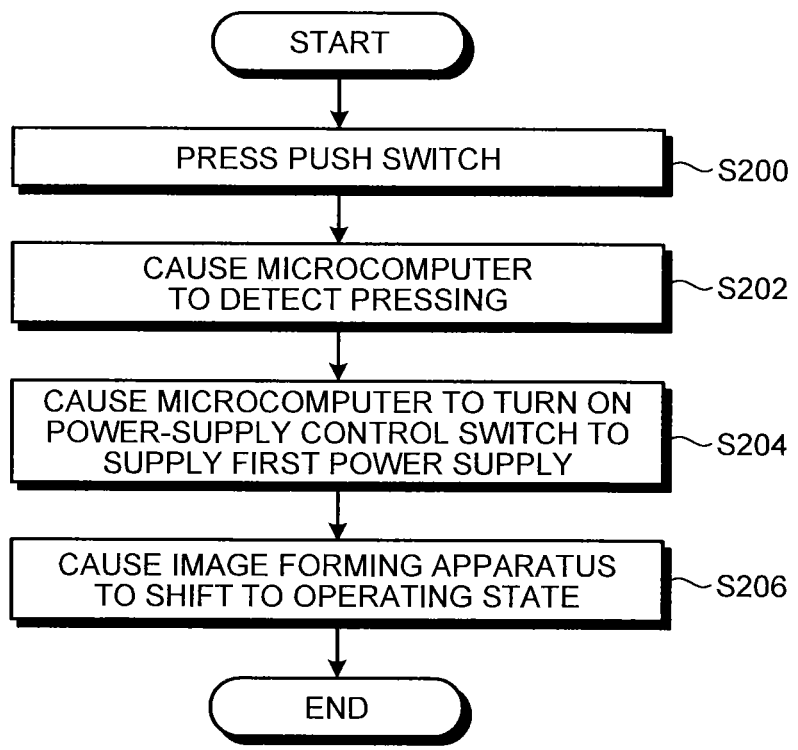
FIG. 3 is a flowchart of an example of an operation performed by the image forming apparatus in a case of turning on a main power supply.

FIG. 3 is a flowchart of an example of an operation performed by the image forming apparatus 1 in a case of turning on a main power supply (the first power supply 28a). As shown in FIG. 3, at step S200, the push switch 18 is pressed.

At step S202, the microcomputer 30 detects the pressing of the push switch 18.

At step S204, the microcomputer 30 of the image forming apparatus 1 turns on the power-supply control switch 22 to cause the first power supply 28a to apply a DC voltage (supply power from the first power supply 28a) to the controller 4, the panel 10, the plotter 12, the scanner 14, and the facsimile 16.

At step S206, the controller 4, the panel 10, the plotter 12, the scanner 14, and the facsimile 16 are started and the image forming apparatus 1 shifts from a standby state to an operating state.

Figure 4:
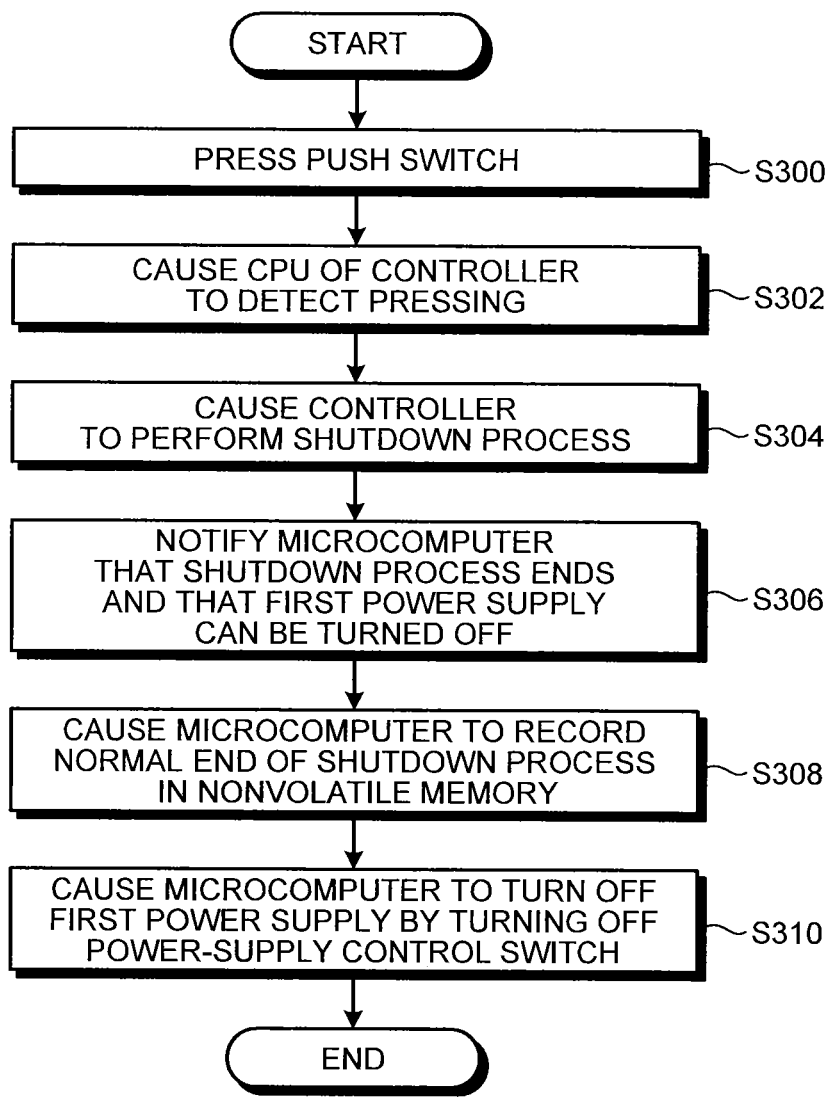
FIG. 4 is a flowchart of an example of an operation performed by the image forming apparatus in a case of turning off a main power supply.

FIG. 4 is a flowchart of an example of an operation performed by the image forming apparatus 1 in a case of turning off a main power supply (the first power supply 28a). As shown in FIG. 4, at step S300, the push switch 18 is pressed in a state where the first power supply 28a is turned on.

At step S302, the CPU 44 of the controller 4 detects the pressing of the push switch 18.

At step S304, the controller 4 performs a shutdown process for stopping the access or the like to the nonvolatile memory 38, an HDD (not shown) or the like.

At step S306, the controller 4 notifies the microcomputer 30 that the shutdown process ends and that the first power supply 28a can be turned off.

At step S308, the microcomputer 30 records the normal end of the shutdown process in the nonvolatile memory 38.

At step S310, the microcomputer 30 turns off the first power supply 28a by turning off the power-supply control switch 22.

Figure 5:
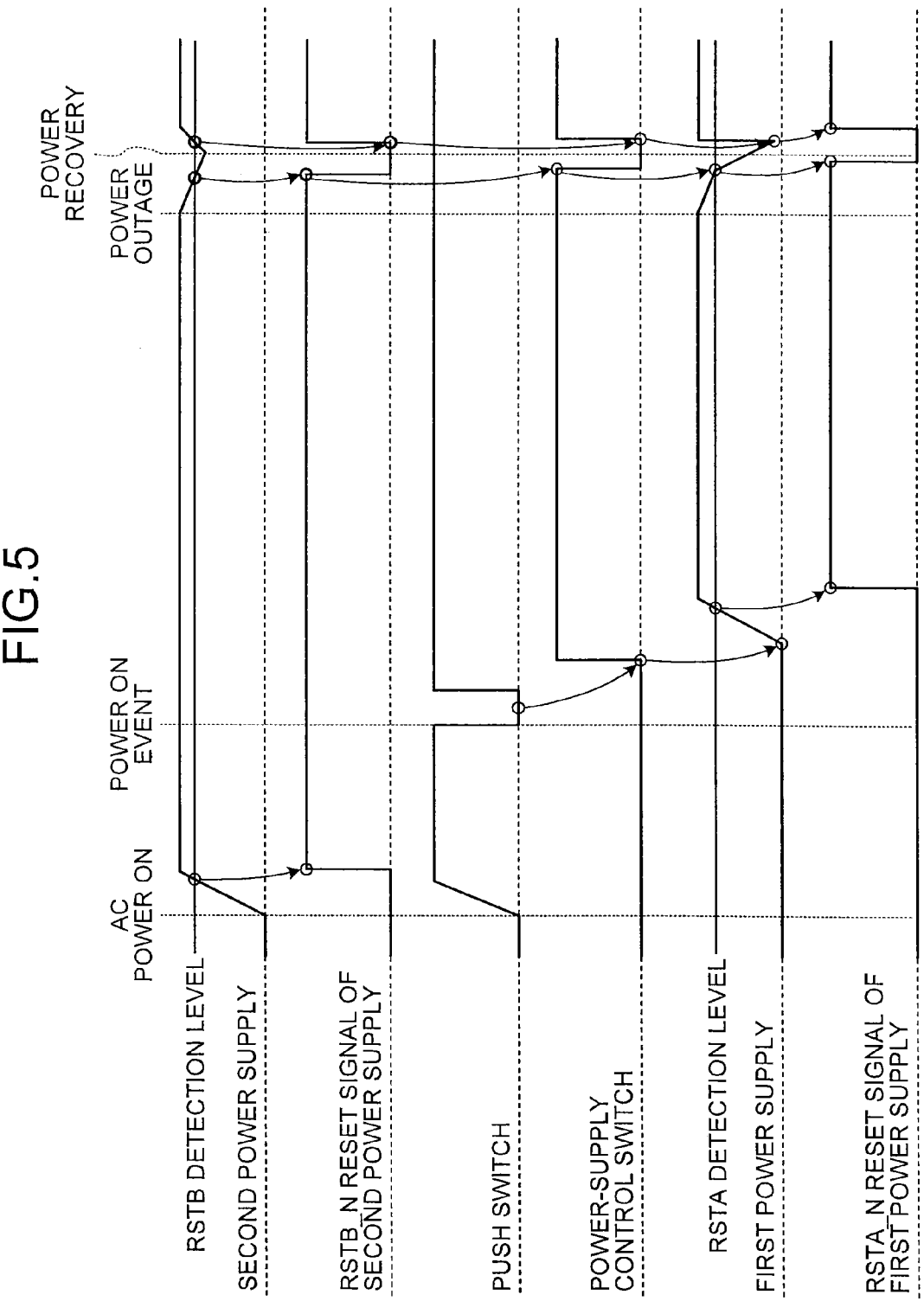
FIG. 5 is a timing chart of operations performed by a first power supply, a second power supply, and peripheral devices thereof in a case where the duration of power outage is short after the connection of a power plug to an outlet.

FIG. 5 is a timing chart of operations performed by the first power supply 28a, the second power supply 28b, and peripheral devices thereof in a case where the duration of power outage is short after the connection of the power plug 200 to an outlet. After the power plug 200 is connected to the outlet, commercial power is supplied to the image forming apparatus 1 (AC POWER ON). After the commercial power is supplied to the image forming apparatus 1, the voltage of the second power supply 28b rises.

When the voltage of the second power supply 28b is equal to or higher than a preset voltage (RSTB detection level), the reset of the microcomputer 30 is released in response to the reset signal (RSTB_N). That is, the microcomputer 30 is started by releasing the reset.

When the push switch 18 is pressed after starting the microcomputer 30 (POWER-ON EVENT OCCURS), the microcomputer 30 detects the pressing of the push switch 18. After detecting the pressing of the push switch 18, the microcomputer 30 turns on the first power supply 28a by turning on the power-supply control switch 22.

When the first power supply 28a is turned on and the voltage of the first power supply 28a is equal to or higher than a preset voltage (RSTA detection level), the reset of the CPU 44 is released in response to the reset signal (RSTA_N). That is, the CPU 44 is started by releasing the reset.

When power outage occurs, the voltages of the second power supply 28b and the first power supply 28a start falling. When the voltage of the second power supply 28b is lower than the RSTB detection level, the reset of the microcomputer 30 is asserted in response to the reset signal (RSTB_N). After the assertion of the reset, the microcomputer 30 stops its operation and the GPIOs 33, 34, 35, and 36 return to an initial logic. The POWER_ON signal output from the GPIO 34 also returns to an initial logic. The initial logic of the POWER_ON signal is logic for turning off the power-supply control switch 22. That is, as the power-supply control switch 22 is turned off, the first power supply 28a is also turned off.

Upon power recovery from the power outage, the voltage of the second power supply 28b rises. When the voltage of the second power supply 28b is equal to or higher than the RSTB detection level, the microcomputer 30 is started by releasing the reset. The microcomputer 30 determines that the previous shutdown is not normal by accessing the nonvolatile memory 38. The microcomputer 30 turns on the first power supply 28a by turning on the power-supply control switch 22.

In this way, the second reset IC 26 performs a setting of (a resetting of) the microcomputer 30 such that the power-supply control switch 22 can switch off the first power supply 28a when the voltage of the second power supply 28b is lower than a preset voltage. Furthermore, the second reset IC 26 performs a setting of the microcomputer 30 such that the power-supply control switch 22 can switch on the first power supply 28a when the voltage of the second power supply 28b is equal to or higher than a preset voltage. That is, the second reset IC 26 serves as a setting change unit that changes the setting of the microcomputer 30.

Furthermore, the first reset IC 24 starts the CPU 44 (or the controller 4) when the voltage of the first power supply 28a is equal to or higher than a preset voltage. Further, the first reset IC 24 stops the CPU 44 (or the controller 4) when the voltage of the first power supply 28a is lower than a preset voltage. That is, the first reset IC 24 serves as a start/stop control unit that controls the CPU 44 (or the controller 4) to be started or stopped.

Even if the duration of power outage is even shorter and the voltage of the second power supply 28b does not fall enough to be lower than the preset voltage (RSTB detection level), the image forming apparatus 1 can continue its operation and no power supply problem occurs. That is, the image forming apparatus 1 can be started after a power recovery from power outage irrespectively of the duration of the power outage.

A timing at which the microcomputer 30 turns on the first power supply 28a after power outage is explained next in detail. In a case of turning on the first power supply 28a after power outage, the microcomputer 30 turns on the power-supply control switch 22 after passage of the time required until the voltage of the first power supply 28a sufficiently falls (so as to be equal to substantially 0 volt).

Figure 6:
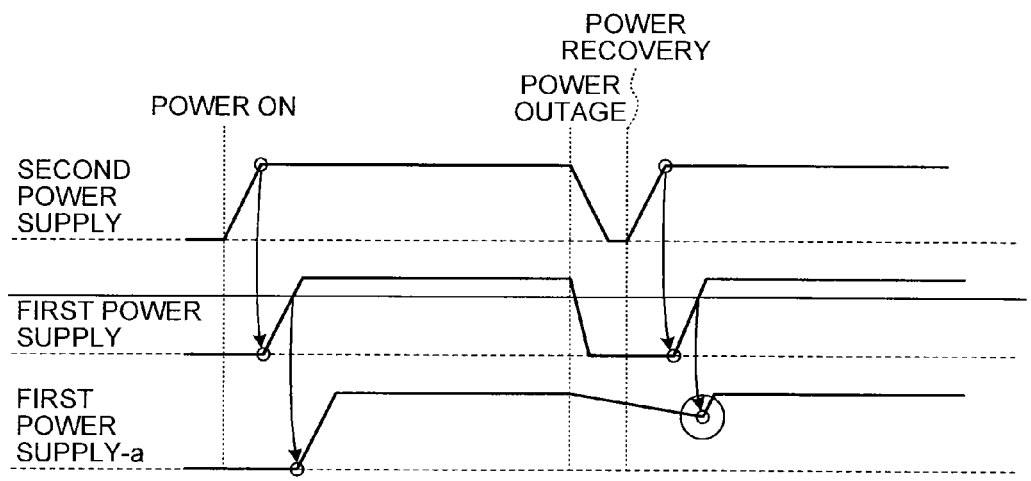
FIG. 6 is a timing chart of a timing at which the voltage of respective power supplies rises.
Figure 7:
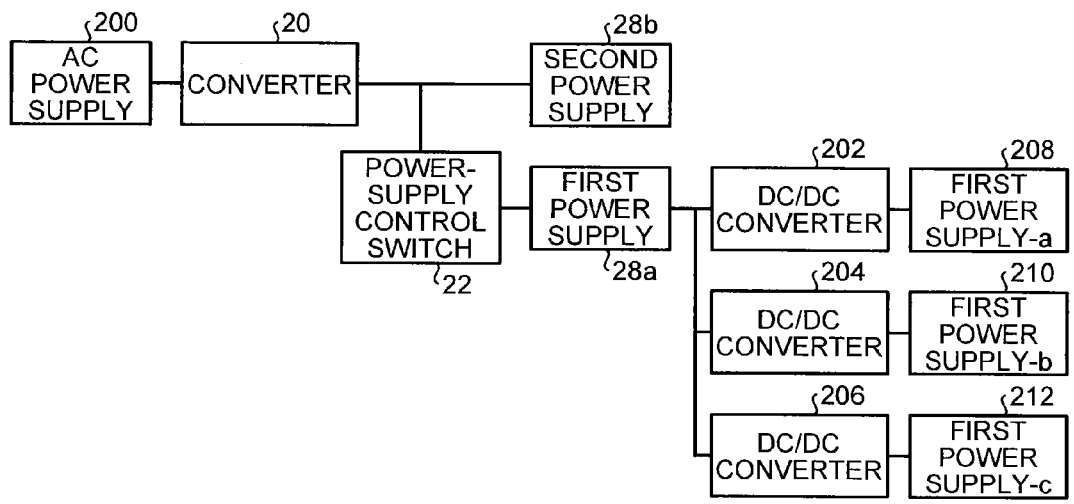
FIG. 7 depicts power supply systems for which the timing shown in FIG. 6 is possibly generated.

FIG. 6 is a timing chart of a timing at which the voltage of respective power supplies rises. FIG. 7 depicts power supply systems for which the timing shown in FIG. 6 is possibly generated. As shown in FIG. 6, in a case of normally turning on the power supply of the image forming apparatus 1, the voltage of the first power supply 28a rises after the voltage of the second power supply 28b rises.

As shown in FIG. 7, when the first power supply 28a is divided into, for example, three power supply systems, which are a first power supply-a 208, a first power supply-b 210, and a first power supply-c 212 by DC/DC converters 202, 204, and 206, respectively, it is necessary to take account of an order (a sequence) of the rise of the respective voltages.

For example, it is assumed to impose a constraint that a failure possibly occurs when the first power supply-a 208 is not turned on after the first power supply 28a is turned on. In this case, the above constraint is normally conformed to by inputting "Power Good" of the first power supply 28a to an OE (Output Enable) of the first power supply-a 208 after the first power supply 28a is turned on.

However, as shown in FIG. 6, in a case of a power recovery from power outage after the voltage of the first power supply 28a sufficiently falls, the voltage of the first power supply-a 208 often insufficiently falls because of a difference in load or the like among respective power supply systems. That is, devices to which power is supplied from the first power supply 28a and the first power supply-a 208, respectively, possibly deviate from the constraint of the order (the sequence) of the rise of the respective voltages.

Considering the above problem, the microcomputer 30 turns on the power-supply control switch 22 after passage of the time required until voltages of all the power supply systems deriving from the first power supply 28a fully fall. It is thereby possible that, even after power outage, the microcomputer 30 turns on all the power supply systems through a sequence similar to that for normally turning on the power supply.

First Modification

Figure 8:
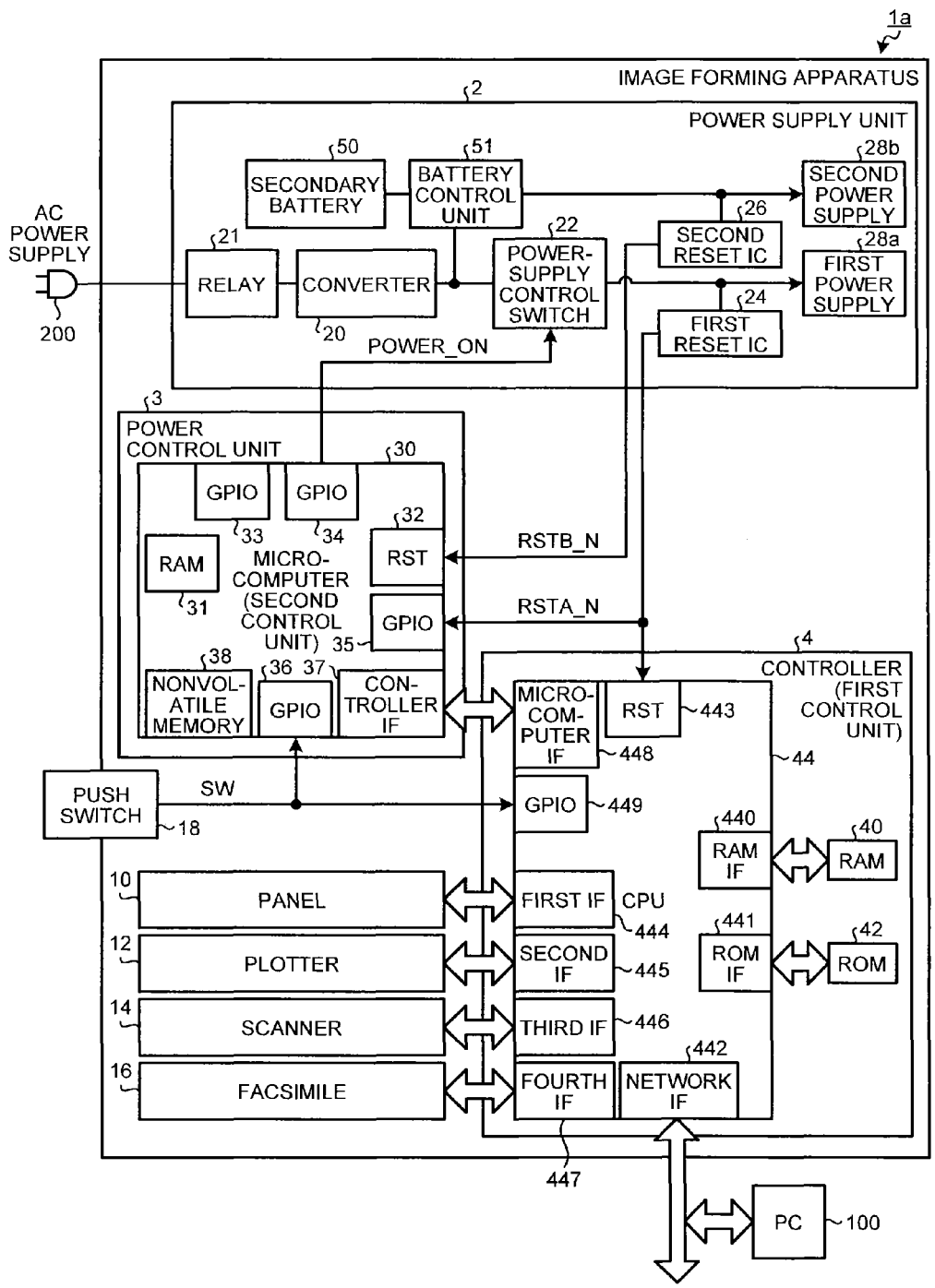
FIG. 8 is a configuration diagram of an example of an outline of a first modification of the image forming apparatus.

A first modification of the image forming apparatus 1 is explained next. FIG. 8 is a configuration diagram of an example of an outline of the first modification of the image forming apparatus 1 (an outline of an image forming apparatus 1a). The image forming apparatus 1a is configured to additionally provide a relay 21, a secondary battery 50, and a battery control unit 51 in the power supply unit 2 shown in FIG. 1.

The relay 21 applies an AC voltage or shuts off the supply of an AC voltage to the converter 20 by being turned on or off. An electromotive force of the secondary battery 50 is substantially identical to that of the second power supply 28b. The battery control unit 51 executes a control to store the power in the secondary battery 50 while the relay 21 is turned on, and to supply the power from the secondary battery 50 to the second power supply 28b while the relay 21 is turned off. Furthermore, the microcomputer 30 turns off the relay 21 when the power-supply control switch 22 switches off the first power supply 28a.

When power outage occurs in a state where the first power supply 28a is turned on, the voltage of the first power supply 28a falls. When the voltage of the first power supply 28a is lower than the RSTA detection level, the reset signal (RSTA_N) is set Low. The microcomputer 30 receives the Low-level reset signal (Low RSTA_N) by the GPIO 35, thereby determining that power outage or the like causes the voltage of the first power supply 28a to be lower than the RSTA detection level. The microcomputer 30 can turn off the relay 21 when determining that there is power outage.

In this way, the image forming apparatus 1a can be in a standby state by making power consumption of the AC voltage 0 watt when the relay 21 shuts off the supply of the AC voltage from the power plug 200 and the secondary battery 50 supplies power to the second power supply 28b.

Second Modification

Figure 9:
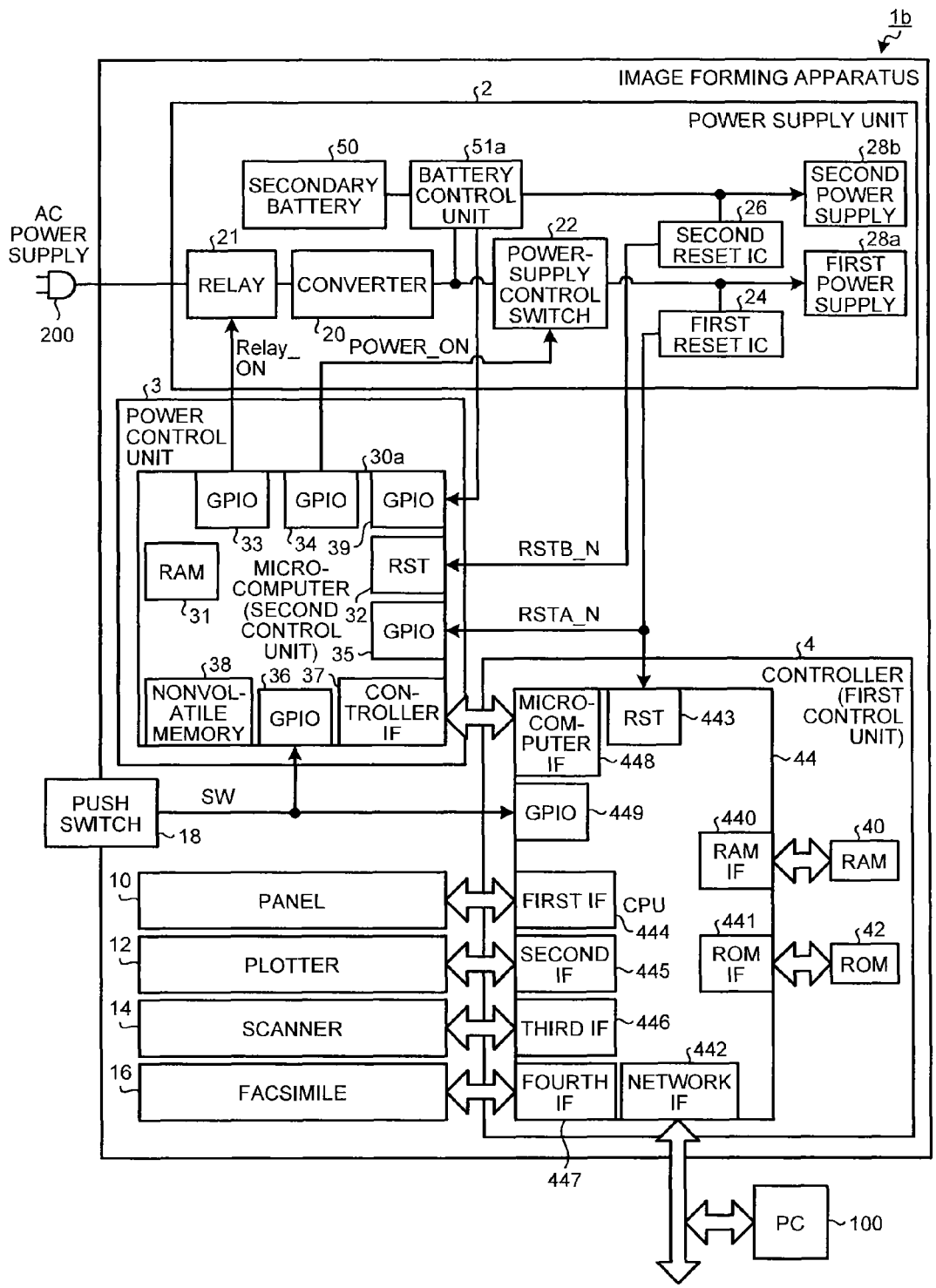
FIG. 9 is a configuration diagram of an example of an outline of a second modification of the image forming apparatus.

A second modification of the image forming apparatus 1 is explained next. FIG. 9 is a configuration diagram of an example of an outline of the second modification of the image forming apparatus 1 (an outline of an image forming apparatus 1b). The image forming apparatus 1b is configured to additionally provide the relay 21, the secondary battery 50, and a battery control unit 51a in the power supply unit 2 shown in FIG. 1. The image forming apparatus 1b is also configured to provide a microcomputer 30a that includes a GPIO 39 in place of the microcomputer 30 in the power control unit 3 shown in FIG. 1.

The battery control unit 51a outputs a storage quantity signal indicating whether a residual storage quantity of the secondary battery 50 is equal to or larger than a preset storage quantity to the GPIO 39 of the microcomputer 30a. The microcomputer 30a turns on the relay 21 when the residual storage quantity indicated by the storage quantity signal is smaller than the preset storage quantity.

When the relay 21 is turned on, the converter 20 converts an AC voltage into a DC voltage, and the battery control unit 51a executes a control to store power in the secondary battery 50. When preset power is stored in the secondary battery 50, the battery control unit 51a stops storing of the power in the secondary battery 50. The microcomputer 30a turns off the relay 21 when the battery control unit 51a stops storing the power in the secondary battery 50. Therefore, it is possible to prevent the microcomputer 30a from stopping its operation because of the shortage of the residual storage quantity of the secondary battery 50.

Third Modification

Figure 10:
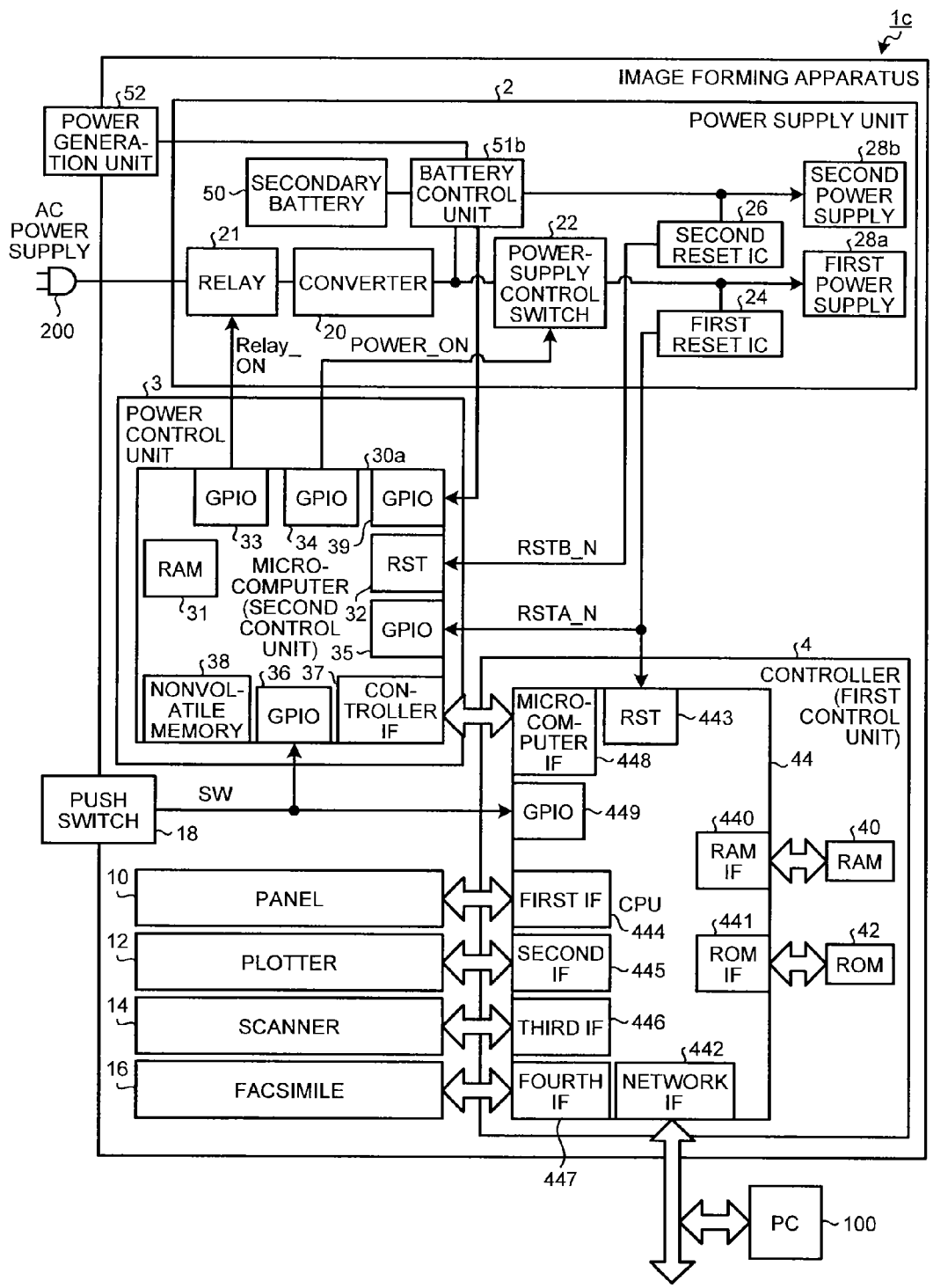
FIG. 10 is a configuration diagram of an example of an outline of a third modification of the image forming apparatus.

A third modification of the image forming apparatus 1 is explained next. FIG. 10 is a configuration diagram of an example of an outline of the third modification of the image forming apparatus 1 (an outline of an image forming apparatus 1c). The image forming apparatus 1c is configured to additionally provide a power generation unit 52 for the power supply unit 2 shown in FIG. 9. Furthermore, in place of the battery control unit 51, a battery control unit 51b is provided in the power supply unit 2 shown in FIG. 9.

The battery control unit 51b executes a control to store power in the secondary battery 50 while controlling a DC voltage output from the converter 20 to be applied to the second power supply 28b. The battery control unit 51b also executes a control to supply power generated by the power generation unit 52 to the second power supply 28b in preference to the DC voltage into which the converter 20 converts the AC voltage, and to store surplus power in the secondary battery 50. Therefore, it is possible to prevent the shortage of the residual storage quantity of the secondary battery 50 in a state where the first power supply 28a is turned off.

Fourth Modification

Figure 11:
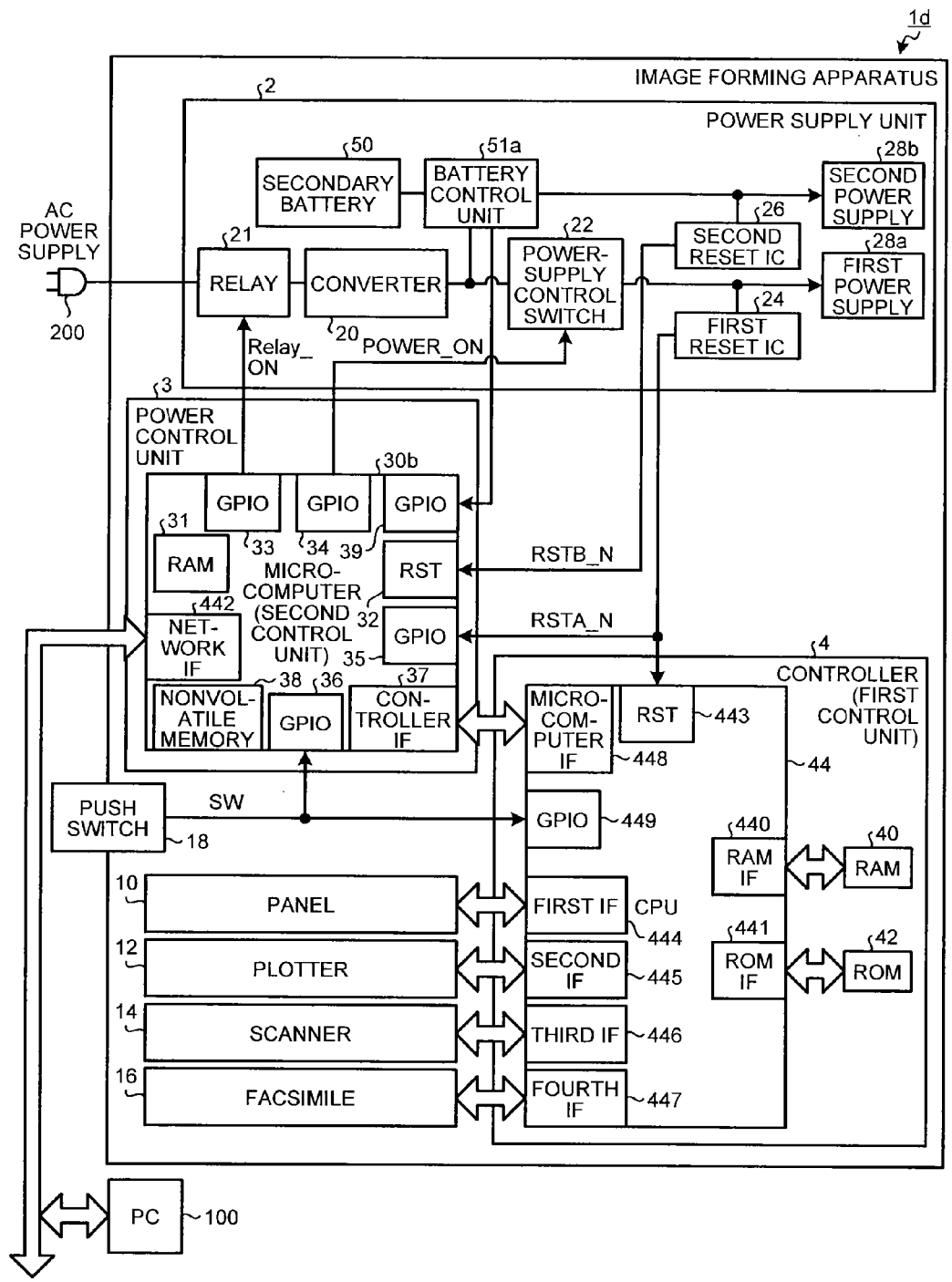
FIG. 11 is a configuration diagram of an example of an outline of a fourth modification of the image forming apparatus.

A fourth modification of the image forming apparatus 1 is explained next. FIG. 11 is a configuration diagram of an example of an outline of the fourth modification of the image forming apparatus 1 (an outline of an image forming apparatus 1d). The image forming apparatus 1d is configured to provide the network IF 442 that is provided in the controller 4 shown in FIG. 9 in a microcomputer 30b. Therefore, even if the controller 4 is turned off, it is possible to communicate with the external PC 100 or the like via the network by the microcomputer 30b that is operated by the power supplied from the second power supply 28b.

Fifth Modification

Figure 12:
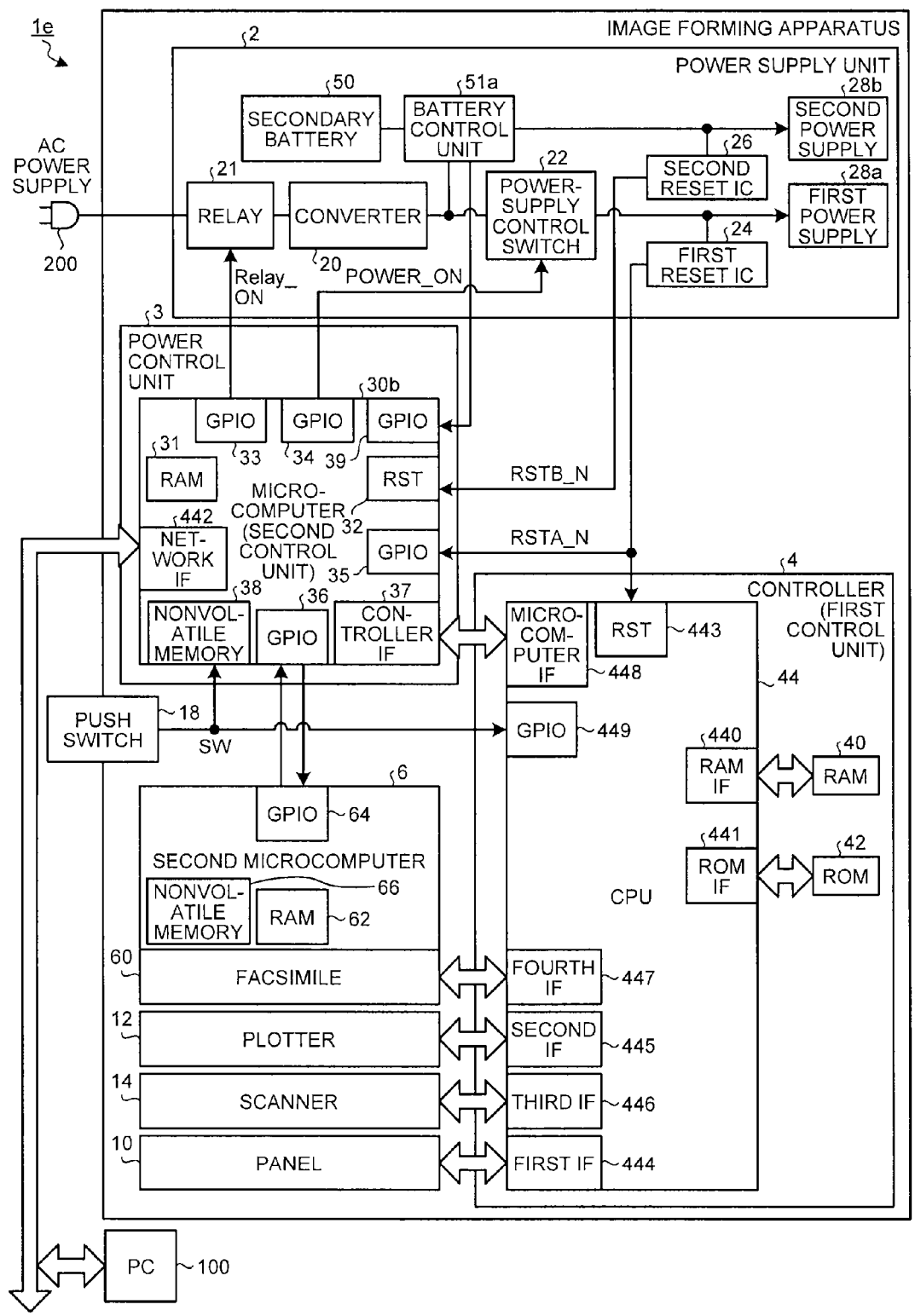
FIG. 12 is a configuration diagram of an example of an outline of a fifth modification of the image forming apparatus.

A fifth modification of the image forming apparatus 1 is explained next. FIG. 12 is a configuration diagram of an example of an outline of the fifth modification of the image forming apparatus 1 (an outline of an image forming apparatus 1e). The image forming apparatus 1e is configured so that a facsimile 60 included in a second microcomputer 6 replaces the facsimile 16 shown in FIG. 1. Furthermore, the second microcomputer 6 includes a RAM 62, a GPIO 64, and a nonvolatile memory 66 in addition to the facsimile 60. The second microcomputer 6 receives an incoming facsimile call from an external public circuit by causing the GPIO 64 to communicate with the GPIO 36 of the microcomputer 30b. That is, the image forming apparatus 1e can receive an incoming facsimile call via the microcomputer 30b and can thereby achieve further energy saving.

In the above embodiment, as an example, the image forming apparatus 1 has been explained as the information processing apparatus according to the present invention; however, the present invention is not limited thereto and the present invention is also applicable to other information processing apparatuses that include a first control unit and a second control unit.

According to the present invention, a main power supply can be turned on even if the duration of power outage is short.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
a power supply that receives power when connected to an external power source, the power supply including a first power supply, a second power supply, a first reset circuit and a second reset circuit;
a power control circuit that is powered by the power supply;
a switch configured to switch on or off the power supply; and
a control circuit configured to detect a switching operation of the switch, wherein
the switch enters a first operating state when the power supply stops receiving power from the external power source,
the first reset circuit is configured to start or stop the control circuit according to a voltage of the first power supply,
the second reset circuit is configured to start or stop the power control circuit according to a voltage of the second power supply,
the second reset circuit is configured to stop the power control circuit when the power supply stops receiving power from the external power source,
the second reset circuit is configured to start the power control circuit when the power supplied to the power supply from the external power source is restarted after a predetermined period of time, and
the first reset circuit is configured to start the control circuit when the power control circuit is started by the second reset circuit and the switch maintains the first operating state.

2. The information processing apparatus according to claim 1, wherein
the second reset circuit stops the power control circuit when the voltage of the second power supply is lower than a preset voltage, and starts the power control circuit when the voltage of the second power supply is equal to or higher than the preset voltage, and
the first reset circuit stops the control circuit when the voltage of the first power supply, which varies according to a setting performed by the second reset circuit with respect to the power control circuit, is lower than a preset voltage, and starts the control circuit when the voltage of the first power supply is equal to or higher than the preset voltage.

3. The information processing apparatus according to claim 1, wherein
the power supply further includes a switching circuit,
the switching circuit is configured to switch on or off the first power supply according to the switching operation of the switch, and the switching circuit is configured to switch on or off the first power supply according to a setting performed by the second reset circuit with respect to the power control circuit.

4. The information processing apparatus according to claim 3, further comprising a memory configured to store first information indicating whether the information processing apparatus is stopped according to a preset procedure, wherein
the power control circuit controls the switching circuit according to the first information.

5. The information processing apparatus according to claim 4, wherein when the switching circuit switches on the first power supply after the first power supply has been switched off, the power control circuit is configured to
control the switching circuit to turn on the first power supply after a preset period of time, and
control the switching circuit to turn on the first power supply when the first information indicates that the information processing apparatus is not stopped according to the preset procedure.

6. The information processing apparatus according to claim 3, wherein the external power source is an AC power source, and the information processing apparatus further comprises:
a converter configured to convert an alternating-current voltage supplied from the external power source into a direct-current voltage and to apply the direct-current voltage to the first power supply and the second power supply;
a relay configured to turn on or off and to apply or shut out the alternating-current voltage to the converter; and
a battery whose electromotive force is substantially identical to that of the second power supply, wherein
the switching circuit switches on or off the first power supply by applying or shutting out the direct-current voltage to the first power supply, and
the power control circuit turns off the relay when the switching circuit switches off the first power supply.

7. The information processing apparatus according to claim 6, further comprising a battery control circuit configured to store power in the battery while the relay is turned on, and to supply power from the battery to the second power supply while the relay is turned off, wherein
the battery control circuit outputs a storage quantity signal indicating whether a residual storage quantity of the battery is equal to or larger than a preset storage quantity to the power control circuit, and
the power control circuit turns on the relay when the residual storage quantity indicated by the storage quantity signal is smaller than the preset storage quantity.

8. The information processing apparatus according to claim 7, further comprising a power generation circuit configured to generate power, wherein
the battery control circuit executes a control to supply power generated by the power generation circuit to the second power supply, instead of the direct-current voltage, and to store surplus power in the battery.

9. The information processing apparatus according to claim 1, further comprising a communication circuit configured to communicate with an external device via a network, wherein
the second power supply supplies power to the communication circuit.

10. The information processing apparatus according to claim 1, wherein the information processing apparatus receives an incoming facsimile call via the control circuit.

11. A method of controlling an information processing apparatus, the apparatus including:
a power supply that receives power when connected to an external power source, the power supply including a first power supply, a second power supply, a first reset circuit and a second reset circuit;
a power control circuit that is powered by the power supply;
a switch configured to switch on or off the power supply and to enter a first operating state when the power supply stops receiving power from the external power source; and
a control circuit configured to detect a switching operation of the switch, wherein
the first reset circuit starts or stops the control circuit according to a voltage of the first power supply and the second reset circuit starts or stops the power control circuit according to a voltage of the second power supply,
the method comprising:
stopping, by the second reset circuit, the power control circuit when the power supply stops receiving power from the external power source;
starting, by the second reset circuit, the power control circuit when the power supplied to the power supply from the external power source is restarted after a predetermined period of time; and
starting, by the first reset circuit, the control circuit when the power control circuit is started by the second reset circuit and the switch maintains the first operating state.

12. The information processing method according to claim 11, further comprising:
stopping, by the second reset circuit, the power control circuit when the voltage of the second power supply is lower than a preset voltage;
starting, by the second reset circuit, the power control circuit when the voltage of the second power supply is equal to or higher than the preset voltage;
stopping, by the first reset circuit, the control circuit when the voltage of the first power supply, which varies according to a setting performed by the second reset circuit with respect to the power control circuit, is lower than a preset voltage; and
starting, by the first reset circuit, the control circuit when the voltage of the first power supply is equal to or higher than the preset voltage.

13. The information processing method according to claim 11, wherein
the power supply further includes a switching circuit,
the switching circuit is configured to switch on or off the first power supply according to the switching operation of the switch, and
the switching circuit is configured to switch on or off the first power supply according to a setting performed by the second reset circuit with respect to the power control circuit.

14. The information processing method according to claim 13, wherein the information processing apparatus further includes a memory configured to store first information indicating whether the information processing apparatus is stopped according to a preset procedure, wherein
the power control circuit controls the switching circuit according to the first information.

15. The information processing method according to claim 14, further comprising, when the switching circuit switches on the first power supply after the first power supply has been switched off:

controlling, by the power control circuit, the switching circuit to turn on the first power supply after a preset period of time; and controlling, by the power control circuit, the switching circuit to turn on the first power supply when the first information indicates that the information processing apparatus is not stopped according to the preset procedure.

16. The information processing method according to claim 14, wherein the external power source is an AC power source, the information processing apparatus further includes a converter configured to convert an alternating-current voltage supplied from the external power source into a direct-current voltage and to apply the direct-current voltage to the first power supply and the second power supply;

a relay configured to turn on or off and to apply or shut out the alternating-current voltage to the converter; and a battery whose electromotive force is substantially identical to that of the second power supply, wherein the switching circuit switches on or off the first power supply by applying or shutting out the direct-current voltage to the first power supply, and the power control circuit turns off the relay when the switching circuit switches off the first power supply.

17. The information processing method according to claim 16, wherein the information processing apparatus further includes a battery control circuit configured to store power in the battery while the relay is turned on, and to supply power from the battery to the second power supply while the relay is turned off, wherein the battery control circuit outputs a storage quantity signal indicating whether a residual storage quantity of the battery is equal to or larger than a preset storage quantity to the power control circuit, and the power control circuit turns on the relay when the residual storage quantity indicated by the storage quantity signal is smaller than the preset storage quantity.

18. The information processing method according to claim 17, wherein the information processing apparatus further includes a power generation circuit configured to generate power, and the method further comprises:

controlling, by the battery control circuit, the supply of power generated by the power generation circuit to the second power supply, instead of the direct-current voltage, and to store surplus power in the battery.

19. The information processing method according to claim 11, wherein the information processing apparatus further includes a communication circuit configured to communicate with an external device via a network, and the second power supply supplies power to the communication circuit.

20. An information processing apparatus comprising:

a power supply that receives power when connected to an external power source, the power supply including a first power supply, a second power supply, a first reset circuit and a second reset circuit;

a power control circuit that is powered by the power supply;

a switch configured to switch on or off the power supply; and a control circuit configured to detect a switching operation of the switch, wherein the switch enters a first operating state when the power supply stops receiving power from the external power source, the second reset circuit is configured to stop the power control circuit when the power supply stops receiving power from the external power source, the second reset circuit is configured to start the power control circuit when the power supplied to the power supply from the external power source is restarted after a predetermined period of time, and the first reset circuit is configured to start the control circuit when the power control circuit is started by the second reset circuit and the switch maintains the first operating state.

* * * * *